(12) United States Patent
Choi et al.

(10) Patent No.: US 8,053,045 B2
(45) Date of Patent: Nov. 8, 2011

(54) STYRENE-BUTADIENE LATEX BINDER FOR INK-JET PAPER, PREPARATION METHOD THEREOF AND COATING LIQUID CONTAINING THE SAME

(75) Inventors: Ho-Yeul Choi, Daejeon (KR); Ji-Sang Jeong, Daejeon (KR); Dae-Ho Lee, Daejeon (KR); Sang-Gil Lee, Seoul (KR); Hak-lae Lee, Seoul (KR); Chang-sun Han, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/517,917

(22) PCT Filed: Dec. 4, 2007

(86) PCT No.: PCT/KR2007/006229
§ 371 (c)(1),
(2), (4) Date: Sep. 16, 2010

(87) PCT Pub. No.: WO2008/069538
PCT Pub. Date: Jun. 12, 2008

(65) Prior Publication Data
US 2011/0014402 A1 Jan. 20, 2011

(30) Foreign Application Priority Data

Dec. 7, 2006 (KR) .................. 10-2006-0123759
Nov. 2, 2007 (KR) .................. 10-2007-0111484

(51) Int. Cl.
*B41M 5/40* (2006.01)
(52) U.S. Cl. ............. 428/32.21; 428/32.28; 428/32.29; 428/32.34; 428/32.38; 526/340; 526/297; 526/318.6; 526/324; 524/575; 524/503

(58) Field of Classification Search ............. 428/32.21, 428/32.28, 32.29, 32.34, 32.38; 526/340, 526/297, 318.6, 324; 524/575, 503
See application file for complete search history.

(56) References Cited

U.S. PATENT DOCUMENTS

| 5,770,303 A | 6/1998 | Weinert et al. | |
| 2006/0263602 A1* | 11/2006 | Choi et al. | 428/407 |

FOREIGN PATENT DOCUMENTS

| CN | 1788039 A | 6/2006 |
| JP | 2005-014611 A | 1/2005 |
| KR | 2001-0004466 A | 1/2001 |
| KR | 2002-0050007 A | 6/2002 |
| KR | 2004-0057070 A | 7/2004 |
| KR | 2005-0004949 A | 1/2005 |
| KR | 20050004949 A | 1/2005 |

OTHER PUBLICATIONS

International Search Report, PCT/KR2007/006229, dated Feb. 14, 2008.
Office Action from corresponding Chinese Applicatin No. 200780045208.3 issued Sep. 3, 2010.

* cited by examiner

*Primary Examiner* — Betelhem Shewareged
(74) *Attorney, Agent, or Firm* — Lerner, David, Littenberg, Krumholz & Mentlik, LLP

(57) ABSTRACT

The present invention relates to a styrene-butadiene latex, a preparation method thereof and a coating liquid containing the same, more precisely a styrene-butadiene latex binder for ink-jet paper containing ethylenically unsaturated monomer by 0.1-1.5 weight parts with lowering surface negative charge density, a preparation method thereof and a coating liquid containing the same. The present invention provides a coating liquid for ink-jet paper having excellent price competitiveness and coating work-ability and at the same time reducing energy cost for drying process and thereby provides an ink-jet paper with excellent printing quality.

13 Claims, No Drawings

STYRENE-BUTADIENE LATEX BINDER FOR INK-JET PAPER, PREPARATION METHOD THEREOF AND COATING LIQUID CONTAINING THE SAME

CROSS REFERENCE TO RELATED APPLICATIONS

The present application is a national phase entry under 35U.S.C. §371 of International Application No. PCT/KR2007/006229, filed Dec. 4, 2007, published in English, which claims the benefit of Korean Patent Application No. 10-2006-0123759, filed Dec. 7, 2006 and Korean Patent Application No. 10-2007-0111484, filed Nov. 2, 2007. The disclosures of said applications are incorporated by reference herein.

TECHNICAL FIELD

The present invention relates to a styrene-butadiene latex binder for ink-jet paper, a preparation method thereof and a coating liquid containing the same, more precisely a styrene-butadiene latex binder for ink-jet paper with low surface negative charge density, a preparation method thereof a coating liquid for ink-jet paper with excellent price competitiveness and coating workability with requiring less energy costs for drying process, and an ink-jet paper having satisfactory printing quality.

BACKGROUND ART

Cultural paper which has been a medium for the delivery of information and advertisement, gradually hands over its position to the digital media as popularization of computer and commercialization of internet are realized and innovative development of other electric communication apparatus advance. The method of publishing books and magazines changes from 'printing and distribution' into 'distribution and printing,' and big demand for an adequate paper is expected with the growth of digital system. Unlike the conventional system (printed and bound books are sold in bookstores), the recent digital system sends the information through internet and then a dealer or a consumer searches the information and if wanted the dealer or the consumer prints the information directly by formatted digital printing method. And this digital printing system is expected to be generalized in near future.

The digital printing can be divided largely into two different methods; toner type and ink-jet type. In the late 2000, the digital printing already held 41% of the market in the case that required copies were up to 2000. And its market sharing will be soon as high as the conventional offset printing.

The ink-jet type, the most universal type for digital printing, has been generally used for multiple color printing, which will extend its market sharing according to the generalization of digital camera and the use of images on internet. Up to date, silica has been used as a major material and polyvinyl alcohol and polyvinyl acetate have been used as a binder for the production of ink-jet paper. To increase preservation and image reproducibility, more upgraded materials are multi-layered for photopapers.

The reason of using polyvinyl alcohol and polyvinyl acetate as a binder is that the major material silica has a very wide specific surface area asking a high adhesive force and they have excellent compatibility with ink-jet ink comprising soluble dye. In addition, polyvinyl acetate has a weak ionic strength, suggesting that it does not interact with polydiallyldimethylammonium chloride (polyDADMAC) which is a cation additive used for the production of a coating liquid for ink-jet paper, so that quantum properties for ink-jet paper can be well preserved. However, these water-soluble binders, polyvinyl alcohol and polyvinyl acetate, are very expensive materials and intensively increase the viscosity of a coating liquid, resulting in the decrease of coating workability, the increase of energy cost for drying process and deterioration of the quality of ink-jet paper. In particular, it has been pointed that polyvinyl acetate causes irregularity of a product and has insufficient functions as an ink-jet binder.

DISCLOSURE OF INVENTION

Technical Problem

It is an object of the present invention, to solve the above problems, to provide a styrene-butadiene latex binder for ink-jet paper containing 0.1-1.5 weight parts of ethylenically unsaturated monomer for 100 weight parts of the total monomer and having low surface negative charge density and regular glass transition temperature, and a preparation method of the same.

It is also an object of the present invention to provide a coating liquid for ink-jet paper containing the latex, which has excellent price competitiveness and coating workability and reduces the energy price for drying process.

It is another object of the present invention to provide an ink-jet paper coated with the coating liquid, which has excellent printing quality.

Technical Solution

The above object and other objects of the present invention can be achieved by the following embodiments of the present invention.

To achieve the above objects, the present invention provides a styrene-butadiene latex binder for ink-jet paper, which contains 0.1-1.5 weight parts of ethylenically unsaturated monomer for 100 weight parts of the total monomer and has glass transition temperature of 20-50° C.

The present invention also provides a preparation method of the styrene-butadiene latex.

The present invention further provides a coating liquid for ink-jet paper containing the styrene-butadiene latex.

The present invention also provides an ink-jet paper coated with the coating liquid.

The present invention is described in detail hereinafter.

The present inventors completed this invention by confirming that the use of the styrene-butadiene latex having low surface negative charge density and regular glass transition temperature instead of the high-price polyvinyl acetate, one of the two major materials (polyvinyl alcohol and polyvinyl acetate) for the conventional ink-jet paper binder, has advantages of producing ink-jet paper with excellent printing quality, improvement of coating workability owing to the low viscosity, and reducing drying energy owing to the low water holding capacity.

The styrene-butadiene latex of the present invention is the latex for ink-jet paper binder which contains 0.1-1.5 weight parts of ethylenically unsaturated monomer for 100 weight parts of the total monomer and has glass transition temperature of 20-50° C.

The styrene-butadiene latex is prepared by the polymerization of 100 weight parts of monomer mixture comprising 20-85 weight parts of styrene monomer, 10-70 weight parts of butadiene monomer, 0.5-15 weight parts of vinyl cyan monomer, 0.1-1.5 weight parts of ethylenically unsaturated monomer and 1-25 weight parts of a monomer copolymerizable with the above monomers.

The styrene monomer herein plays a role in regulating hardness and water resistance of the polymerized latex and can be any styrene monomer that has been used for the production of the conventional styrene-butadiene latex.

The butadiene monomer herein gives flexibility to the polymerized latex and can be any butadiene monomer that has been used for the production of the conventional styrene-butadiene latex and preferably 1,3-butadiene.

The ethylenically unsaturated monomer can be unsaturated carboxylic acid or unsaturated polycarboxylic acid alkyl ester having at least one or more carboxylic acid group.

The unsaturated carboxylic acid is preferably one or more compounds selected from the group consisting of methacrylic acid, acrylic acid, itaconic acid, crotonic acid, fumaric acid and maleic acid.

The unsaturated polycarboxylic acid alkyl ester is preferably one or more compounds selected from the group consisting of itaconic acid monoethyl ester, fumaric acid monobutyl ester and maleic acid monobutyl ester.

The ethylenically unsaturated monomer plays a role in maintaining the stability of particles and changes the latex as anionic. However, owing to its anionic property, this monomer can interact with the cationic additive 'polyDADMAC' that has been generally used for the preparation of a coating liquid for ink-jet paper, resulting in the rapid increase of viscosity. Therefore, the content of this monomer is preferably regulated as minimum in order to maintain the stability of particles, which would be 0.1-1.5 weight parts for 100 weight parts of the total monomer.

The vinyl cyan monomer herein is acrylonitrile or methacrylonitrile.

The monomer applicable for the copolymerization is one or more compounds selected from the group consisting of unsaturated carboxylic acid alkyl ester, unsaturated carboxylic acid hydroxyl alkyl ester, unsaturated carboxylic acid amide and its derivatives, and aromatic vinyl monomer.

The unsaturated carboxylic acid alkyl ester is preferably one or more compounds selected from the group consisting of methylacrylate, methylmethacrylate, ethylacrylate and butylacrylate.

The unsaturated carboxylic acid hydroxyl alkyl ester is preferably one or more compounds selected from the group consisting of β-hydroxyethyl acrylate, β-hydroxypropyl acrylate and β-hydroxyethyl methacrylate.

The unsaturated carboxylic acid amide and its derivatives are preferably one or more compounds selected from the group consisting of acrylamide, methacrylamide, it-aconamide, maleic acid monoamide and their derivatives.

The aromatic vinyl monomer is preferably one or more compounds selected from the group consisting of α-methylstyrene, vinyltoluene and p-methylstyrene.

The styrene-butadiene latex binder for ink-jet paper has the particle size of 150-300 nm. When the particle size is in the range, viscosity is lowered and thus coating workability is excellent.

The styrene-butadiene latex binder for ink-jet paper has preferably the glass transition temperature of 20-50° C. When the glass transition temperature is in the range, viscosity and water holding capacity are lowered, and thus coating workability is excellent and drying energy is reduced. If the glass transition temperature is lower than the above range, absorption will be observed on the surface of silica having porous structure and a membrane will be formed, resulting in the decrease of pores of the coating layer. On the contrary, if the glass transition temperature is higher than the above range, adhesive force of the coating layer will be reduced.

The preparation method of the styrene-butadiene latex binder for ink-jet paper of the invention is the polymerization of 100 weight parts of monomer mixture comprising 20-85 weight parts of styrene monomer, 10-70 weight parts of butadiene monomer, 0.5-15 weight parts of vinyl cyan monomer, 0.1-1.5 weight parts of ethylenically unsaturated monomer and 1-25 weight parts of another monomer being able to be copolymerized with the above monomers.

A chain transfer agent can be additionally included in the polymerization of the styrene-butadiene latex and the preferable amount of the chain transfer agent at this time is 0.1-5 weight parts for 100 weight parts of the total monomer.

To regulate the particle size of the styrene-butadiene latex, the conventional styrene-butadiene seed can be used and the content is not limited. The size of the seed is 20-100 nm and the content is preferably 1-15 weight parts for 100 weight parts of the total monomer.

The styrene-butadiene latex can additionally include additives such as a polymerization initiator, an emulsifying agent and electrolytes.

The chain transfer agent is used to regulate molecular weight of the styrene-butadiene latex, gel content and gel structure, which is exemplified by n-dodecyl mercaptan, t-dodecyl mercaptan, etc.

The coating liquid for ink-jet paper of the invention comprises silica (inorganic pigment), polyvinyl alcohol (binder), the styrene-butadiene latex prepared above and polyDADMAC (cation additive).

The coating liquid is preferably composed of 100 weight parts of silica, 30-100 weight parts of the binder and 10-20 weight parts of polyDADMAC.

If the content of the binder is up to 100 weight parts, the binder does not reduce the porosity of the coating layer, resulting in the excellent printing quality. If the content of the binder is at least 30 weight parts, binding strength inside of the coating layer will be excellent, resulting in excellent adhesive force and surface strength.

The binder herein is preferably composed of polyvinyl alcohol and the styrene-butadiene latex at the weight ratio of 5:1-1:5 (polyvinylalcohol:styrene-butadiene latex).

The ink-jet paper is the paper coated with the above coating liquid.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

Examples

Example 1

Preparation of Styrene-Butadiene Latex

A 10 L pressurized reactor equipped with a stirrer, a thermometer, a cooler and a nitrogen gas inlet and designed for the continuous addition of a monomer, an emulsifying agent and a polymerization initiator was filled with nitrogen. To the reactor were added 22 weight parts of butadiene, 62 weight parts of styrene, 10 weight parts of methylmethacrylate, 5 weight parts of acrylonitrile, 1 weight part of methyl-methacrylic acid, 3.5 weight parts of styrene-butadiene seed (prepared by emulsion polymerization of 75 weight % of styrene and 25 weight % of butadiene), 0.5 weight part of dodecyl benzene sodium sulfonate, 0.3 weight part of t-dodecylmercaptan, 0.4 weight part of sodium hydrogen carbonate and 105 weight parts of ion exchange water, for 100 weight parts of the total monomer, and then temperature of the reactor was raised to 82° C. 0.8 weight part of potassium persulfate was added thereto as a polymerization initiator, followed by stirring for approximately 300 minutes to polymerize the styrene-butadiene latex.

<Preparation of Coating Liquid for Ink-Jet Paper>

100 weight parts of silica, 30 weight parts of polyvinyl alcohol, 30 weight parts of the styrene-butadiene latex prepared above, 10 weight parts of a cation additive (polyDADMAC) and 1,050 weight parts of ion exchange water were mixed to prepare the coating liquid ink-jet paper.

<Preparation of Ink-Jet Paper>

The base paper (72 gsm) was coated with the coating liquid prepared above by 8 g/m², which was dried in a 130° C. oven for 20 seconds, followed by calendering at 40° C., 100 kgf/cm to prepare the ink-jet paper.

Example 2

The styrene-butadiene latex, the coating liquid and the ink-jet paper were prepared by the same manner as described in example 1 except that the amount of styrene-butadiene seed was adjusted to 1.5 weight parts to regulate the particle size.

Example 3

The styrene-butadiene latex, the coating liquid and the ink-jet paper were prepared by the same manner as described in example 1 except that butadiene was added by 18 weight parts and styrene was added by 66 weight parts to regulate the glass transition temperature.

Example 4

The styrene-butadiene latex, the coating liquid and the ink-jet paper were prepared by the same manner as described in example 1 except that butadiene was added by 18 weight parts, styrene was added by 66 weight parts, and styrene-butadiene seed was added by 1.5 weight parts to regulate the particle size and the glass transition temperature.

Comparative Example 1

The coating liquid and the ink-jet paper were prepared by using the conventional polyvinyl acetate commercialized for ink-jet paper instead of the styrene-butadiene latex prepared in example 1.

Comparative Example 2

The styrene-butadiene latex, the coating liquid and the ink-jet paper were prepared by the same manner as described in example 1 except that butadiene was added by 31 weight parts and styrene was added by 53 weight parts to compare the glass transition temperature.

Comparative Example 3

The styrene-butadiene latex, the coating liquid and the ink-jet paper were prepared by the same manner as described in example 1 except that butadiene was added by 31 weight parts, styrene was added by 53 weight parts and styrene-butadiene seed was added by 13 weight parts to compare the particle size and the glass transition temperature.

Comparative Example 4

The styrene-butadiene latex, the coating liquid and the ink-jet paper were prepared by the same manner as described in example 1 except that butadiene was added by 38 weight parts, styrene was added by 46 weight parts, itaconic acid was added by 3.5 weight parts, styrene-butadiene seed was added by 13 weight parts and dodecyl benzene sodium sulfonate was added by 0.25 weight part to compare the surface negative charge density.

Comparative Example 5

The styrene-butadiene latex, the coating liquid and the ink-jet paper were prepared by the same manner as described in example 4 except that butadiene was added by 25 weight parts, styrene was added by 59 weight parts, itaconic acid was added by 2.4 weight parts and styrene-butadiene seed was added by 8.5 weight parts to compare the surface negative charge density and the particle size.

Experimental Example

Physical Properties of Styrene-Butadiene Latex

Physical properties of the styrene-butadiene latexes prepared in examples and comparative examples were examined and the results are shown in Table 1.

Particle size—measured by Laser Scattering Analyzer (Nicomp).

Glass transition temperature measured by Differential Scanning Calorimeter (TA) in the presence of nitrogen with raising the temperature by 20° C./min.

Surface negative charge density measured by Particle Charge Detector (Mutek).

TABLE 1

| | Example | | | | Comparative Example | | | | |
|---|---|---|---|---|---|---|---|---|---|
| Latex for binder | 1 | 2 | 3 | 4 | 1 | 2 | 3 | 4 | 5 |
| Particle size (nm) | 180 | 250 | 108 | 250 | 900 | 180 | 120 | 120 | 140 |
| Glass transition temp. (° C.) | 35 | 35 | 45 | 45 | −10 | 15 | 15 | 0 | 25 |
| Surface negative charge density (μeq/g) | 135 | 105 | 165 | 83 | 10 | 125 | 188 | 393 | 277 |

As shown in table 1, the styrene-butadiene latexes (examples 1-4) prepared by using a small amount of ethylenically unsaturated monomer of the invention exhibited low surface negative charge density, while the latexes (comparative examples 4-5) prepared by using a over-dose of ethylenically unsaturated monomer showed significantly high surface negative charge density.

<Physical Properties of Coating Liquid for Ink-Jet Paper>

Physical properties of the coating liquid prepared above were measured by followings and the results are shown in Table 2.

Viscosity—measured by Brookfield Viscometer with spindle #3 at 60 rpm.

Water holding capacity—measured by ÅA-GWR under the condition of 2.0 bar for 60 sec.

TABLE 2

| Coating liquid | Example | | | | Comparative Example | | | | |
|---|---|---|---|---|---|---|---|---|---|
| | 1 | 2 | 3 | 4 | 1 | 2 | 3 | 4 | 5 |
| Viscosity (cPs) | 55 | 55 | 60 | 45 | 62 | 131 | 331 | 1166 | 186 |
| Water holding capacity (g/m') | 91 | 133 | 89 | 129 | 769 | 200 | 1331 | 1213 | 906 |

As shown in Table 2, coating liquids of examples 1-4 of the present invention had lower water holding capacity than the product of comparative example 1 which was prepared by using polyvinyl acetate as a binder.

The coating liquids of comparative examples 2-3 which contained such styrene-butadiene latex that has the glass transition temperature out of the acceptable range determined by the present invention and the coating liquids of comparative examples 4-5 which contained such styrene-butadiene latex having the high surface negative charge density resulted from the overdose of ethylenically unsaturated monomer were confirmed to have significantly increased water holding capacity.

<Physical Properties of Ink-Jet Paper>

Physical properties of the ink-jet paper prepared above were measured by followings after printing with an ink-jet printer (Epson Stylus 830) and the results are shown in Table 3.

Whiteness—measured by Elrepho spectrophotometer (L&W, TAPPI test method T452 om-98).

Opacity—measured by Elrepho spectrophotometer (L&W, TAPPI test method T519 om-96).

Gloss—measured by Gloss meter (L&W, TAPPI test method T480 om-99).

Roundness—measured by Image-pro plus 4.1, an image analyzing program.

Color density—measured by Macbeth Ink Densitometer D19C.

Water fastness—Color density of the printed coating paper was measured. Then, the paper was dipped in distilled water for one hour and dried completely, followed by measuring the color density again. The degree of color density measured after one hour water soaking was presented by % for the primary color density.

Surface strength—measured by IGT tester.

TABLE 3

| Ink-jet paper | | Example | | | | Comparative Example | | | | |
|---|---|---|---|---|---|---|---|---|---|---|
| | | 1 | 2 | 3 | 4 | 1 | 2 | 3 | 4 | 5 |
| Color density | Blue | 0.78 | 0.75 | 0.75 | 0.75 | 0.76 | 0.74 | 0.76 | 0.75 | 0.76 |
| | Red | 1.13 | 1.12 | 1.10 | 1.10 | 1.18 | 1.13 | 1.16 | 1.14 | 1.12 |
| | Yellow | 0.74 | 0.73 | 0.70 | 0.70 | 0.73 | 0.70 | 0.73 | 0.69 | 0.71 |
| | Black | 1.78 | 1.77 | 1.71 | 1.72 | 1.92 | 1.88 | 1.95 | 1.86 | 1.82 |
| Whiteness | | 90.2 | 90.2 | 90.2 | 90.3 | 90.2 | 90.2 | 90.2 | 90.4 | 90.3 |
| Opacity | | 92.9 | 92.8 | 92.9 | 93.1 | 92.5 | 92.8 | 92.6 | 92.6 | 93.1 |
| Gloss | | 3.9 | 4.1 | 4.5 | 4.7 | 3.6 | 4.2 | 3.2 | 3.7 | 3.8 |
| Roundness | | 2.4 | 2.3 | 2.2 | 2.6 | 2.6 | 2.9 | 3.0 | 2.7 | 2.8 |
| Water fastness | | 92 | 93 | 90 | 90 | 90 | 94 | 90 | 89 | 86 |
| Surface strength | | 139 | 120 | 105 | 95 | 75 | 31 | 14 | 21 | 107 |

As shown in Table 3, the ink-jet papers prepared in examples 1-4 of the invention which contained polyvinyl acetate exhibited as excellent color density and whiteness as the ink-jet paper prepared in comparative example 1 and better water fastness and surface strength.

The ink-jet papers of comparative examples 2-5 which contained such styrene-butadiene latex that has the glass transition temperature, particle size and the surface negative charge density out of the acceptable range determined by the present invention exhibited significantly low surface strength and water fastness.

INDUSTRIAL APPLICABILITY

As explained hereinbefore, the styrene-butadiene latex binder for ink-jet paper of the present invention has excellent price competitiveness, low surface negative charge density, and regular glass transition temperature, resulting in increase of coating workability and decrease of energy cost for drying process during the production of the coating liquid for ink-jet paper and thereby can provide the ink-jet paper with excellent printing quality. The present invention also provides a preparation method of the styrene-butadiene latex.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A styrene-butadiene latex binder for ink-jet paper comprising the styrene-butadiene latex prepared from a styrene-butadiene seed having the particle size of 20-100 nm of 1-15 weight parts and a polymer based on total weight parts, wherein the polymer is prepared by emulsion polymerization of mixture comprising 20-85 weight parts of styrene monomer, 10-70 weight parts of butadiene monomer, 0.5-15 weight parts of vinyl cyan monomer, 0.1-1.5 weight parts of unsaturated carboxylic acid and 1-25 weight parts of a monomer copolymerizable with the above monomers, and wherein the styrene-butadiene latex is used with polyvinyl alcohol, has a glass transition temperature of 20-50° C. and a surface negative charge density of 50-200 μeq/g.

2. The styrene-butadiene latex binder for ink-jet paper according to claim 1, wherein the styrene-butadiene latex has a particle size of 150-300 nm.

3. A coating liquid for ink-jet paper comprising silica as an inorganic pigment, the styrene-butadiene latex for ink-jet paper of claim 1, and polyvinyl alcohol.

4. The coating liquid for ink-jet paper according to claim 3, wherein the coating liquid comprises 100 weight parts of silica as the inorganic pigment, 60-100 weight parts of the styrene-butadiene latex for the ink-jet paper and polyvinyl alcohol as a binder, and 10-20 weight parts of polydiallyldimethylammonium chloride as a cation additive.

5. The coating liquid for ink-jet paper according to claim 4, wherein weight ratio of the styrene-butadiene latex binder for ink-jet paper to the polyvinyl alcohol is 5:1-1:5.

6. The coating liquid for ink-jet paper according to claim 4, wherein viscosity of the coating liquid for ink-jet paper is 10-300 cPs.

7. The coating liquid for ink-jet paper according to claim 4, wherein water holding capacity of the coating liquid is 50-1000 g/m².

8. An ink-jet paper treated with the coating liquid of claim 3.

9. A preparation method of a styrene— butadiene latex binder for ink-jet paper comprising adding styrene-butadiene seed having the particle size of 20-100 nm of 1-15 weight parts to a monomer mixture based on total 100 weight parts, and wherein the monomer mixture, wherein the monomer mixture comprises 20-85 weight parts of styrene monomer, 10-70 weight parts of butadiene monomer, 0.5-15 weight parts of vinyl cyan monomer, 0.1-1.5 weight parts of ethylenically unsaturated monomer and 1-25 weight parts of a monomer copolymerizable with the above monomers, based on 100 weight parts of the total monomer, wherein the styrene-butadiene latex has a glass transition temperature of 20-50° C. and a surface negative charge density of 50-200 μeq/g.

10. The preparation method of a styrene-butadiene latex binder for ink-jet paper according to claim 9, wherein the ethylenically unsaturated monomer is one or more compounds selected from the group consisting of unsaturated carboxylic acid and unsaturated polycarboxylic acid alkyl ester having at least one carboxylic group.

11. The preparation method of a styrene-butadiene latex binder for ink-jet paper according to claim 9, further comprising adding a chain transfer agent of 0.1-5 weight parts based on 100 weight parts of the total monomer.

12. The styrene-butadiene latex binder for ink-jet paper according to claim 1, wherein the styrene-butadiene latex has the glass transition temperature of 35-45° C.

13. The preparation method of a styrene-butadiene latex binder for ink-jet paper according to claim 9, wherein the styrene-butadiene latex has the glass transition temperature of 35-45° C.

* * * * *

UNITED STATES PATENT AND TRADEMARK OFFICE
CERTIFICATE OF CORRECTION

PATENT NO. : 8,053,045 B2
APPLICATION NO. : 12/517917
DATED : November 8, 2011
INVENTOR(S) : Ho-Yeul Choi et al.

It is certified that error appears in the above-identified patent and that said Letters Patent is hereby corrected as shown below:

In the Claims:

Column 10, line 2, between "comprising" and "adding", insert a --:--.
Column 10, line 6, "wherein" should read --polymerizing--.

Signed and Sealed this
Sixth Day of August, 2013

Teresa Stanek Rea
*Acting Director of the United States Patent and Trademark Office*